US010444750B2

(12) United States Patent
Makke et al.

(10) Patent No.: US 10,444,750 B2
(45) Date of Patent: Oct. 15, 2019

(54) RIDESHARE VEHICLE CONNECTIVITY TO PASSENGER DEVICES

(71) Applicant: FORD GLOBAL TECHNOLOGIES, LLC, Dearborn, MI (US)

(72) Inventors: Omar Makke, Lyon Township, MI (US); Jeffrey Yeung, Canton, MI (US); Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/463,268

(22) Filed: Mar. 20, 2017

(65) Prior Publication Data
US 2018/0267526 A1 Sep. 20, 2018

(51) Int. Cl.
| | | |
|---|---|---|
| *G05D 1/00* | (2006.01) | |
| *B60R 16/037* | (2006.01) | |
| *G01C 21/34* | (2006.01) | |
| *G06Q 50/30* | (2012.01) | |
| *B60W 30/00* | (2006.01) | |

(52) U.S. Cl.
CPC ......... *G05D 1/0016* (2013.01); *B60R 16/037* (2013.01); *B60W 30/00* (2013.01); *G01C 21/3438* (2013.01); *G06Q 50/30* (2013.01)

(58) Field of Classification Search
CPC combination set(s) only.
See application file for complete search history.

(56) References Cited

U.S. PATENT DOCUMENTS

| | | | |
|---|---|---|---|
| 9,365,188 B1* | 6/2016 | Penilla | B60R 25/2018 |
| 2015/0228000 A1 | 8/2015 | Bijor et al. | |
| 2016/0066004 A1 | 3/2016 | Lieu et al. | |
| 2016/0171637 A1* | 6/2016 | Rai | H04L 67/12 705/13 |
| 2016/0318467 A1* | 11/2016 | Ricci | B60R 16/037 |
| 2016/0321566 A1* | 11/2016 | Liu | G06Q 10/02 |
| 2016/0325755 A1* | 11/2016 | Ricci | H04W 4/21 |
| 2017/0099295 A1* | 4/2017 | Ricci | H04L 63/102 |
| 2017/0249095 A1* | 8/2017 | Ricci | G06F 3/0622 |

(Continued)

*Primary Examiner* — Adam D Tissot
*Assistant Examiner* — Edward J Pipala
(74) *Attorney, Agent, or Firm* — Michael J. Spenner; Brooks Kushman P.C.

(57) ABSTRACT

A ride-share server communicates with both a primary-connected device and a secondary-connected device over a wide-area network. The ride-share server is programmed to receive a request from the secondary-connected device to apply a setting change to a vehicle, and responsive to verifying the secondary-connected device is authorized to command the vehicle, send a second request to the primary-connected device to direct the primary-connected device to command the vehicle to implement the setting change. A secondary-connected device is in communication with a ride-share server over a wide-area network and programmed to send a request to the ride-share server to change a vehicle setting. A primary-connected device is in communication with a computing platform via a device link interface over a local-area connection and with the ride-share server over the wide-area network, and is programmed to request the computing platform to change the setting responsive to validation from the ride-share server.

18 Claims, 4 Drawing Sheets

(56) References Cited

U.S. PATENT DOCUMENTS

| | | | |
|---|---|---|---|
| 2017/0285641 A1* | 10/2017 | Goldman-Shenhar | ....................... B60W 30/182 |
| 2017/0313322 A1* | 11/2017 | Onorato | ............ B60W 50/0098 |
| 2017/0349027 A1* | 12/2017 | Goldman-Shenhar | ....................... B60H 1/00742 |
| 2018/0024725 A1* | 1/2018 | Penilla | ................... B60W 40/08 |
| 2018/0058863 A1* | 3/2018 | Meyer | ................ G01C 21/3415 |
| 2018/0059913 A1* | 3/2018 | Penilla | .................... G07C 5/008 |

* cited by examiner

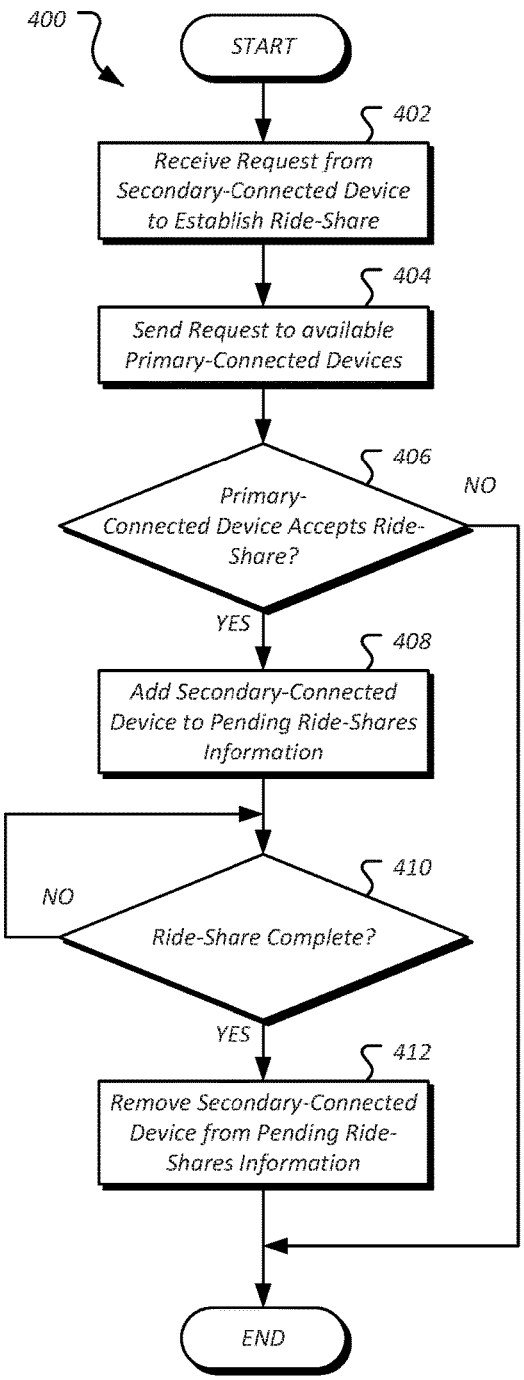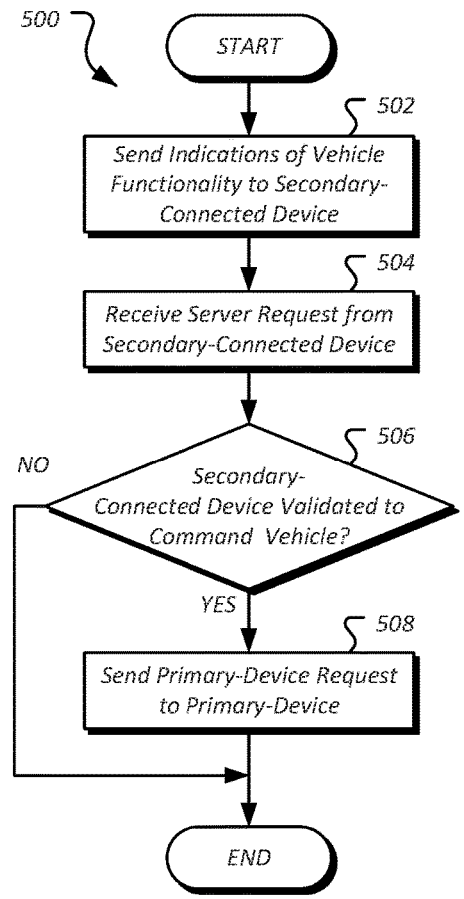
FIG. 4
FIG. 5

US 10,444,750 B2

RIDESHARE VEHICLE CONNECTIVITY TO PASSENGER DEVICES

TECHNICAL FIELD

Aspects of the disclosure generally relate to methods and apparatus for providing passenger devices of rideshare users with connectivity to vehicle functionality.

BACKGROUND

To pair a phone or other mobile device with a vehicle, the user may enable BLUETOOTH on the device to be paired, and may select from the vehicle computing system to begin the pairing process. To complete the pairing, the vehicle may display a personal identification number (PIN), and the user may enter the PIN into the device to be paired to the vehicle. Upon successful entry of the PIN, the vehicle computing system may display a message indicating that the mobile device is paired to the vehicle. Once paired, the vehicle and mobile device may automatically connect. This procedure is useful for users who routinely travel in the same vehicle, but may be inconvenient for users who regularly switch vehicles.

SUMMARY

In one or more illustrative embodiments, a system includes a ride-share server, in communication with both a primary-connected device and a secondary-connected device over a wide-area network, programmed to receive a request from the secondary-connected device to apply a setting change to a vehicle, and responsive to verifying the secondary-connected device is authorized to command the vehicle, send a second request to the primary-connected device to direct the primary-connected device to command the vehicle to implement the setting change.

In one or more illustrative embodiments, a method includes updating ride-share information to indicate a secondary-connected device has established a ride-share for a vehicle; sending the secondary-connected device indications of vehicle settings available for configuration; responsive to verifying via the ride-share information a request from the secondary-connected device to apply a change to the settings, requesting a primary-connected device within the vehicle and connected to a device link interface of the vehicle to update the setting over the interface.

In one or more illustrative embodiments, a system includes a secondary-connected device, in communication with a ride-share server over a wide-area network, programmed to send a request to the ride-share server to change a vehicle setting; and a primary-connected device, in communication with a computing platform via a device link interface over a local-area connection and with the ride-share server over the wide-area network, programmed to request the computing platform to change the setting responsive to validation from the ride-share server.

BRIEF DESCRIPTION OF THE DRAWINGS

FIG. 4 illustrates an example process for providing a ride-share to the secondary-connected device via the ride-share server; and FIG. 5 illustrates an example process for controlling vehicle functions of the vehicle performing the ride-share from the secondary-connected device via the ride-share server.

DETAILED DESCRIPTION

Figure 1:
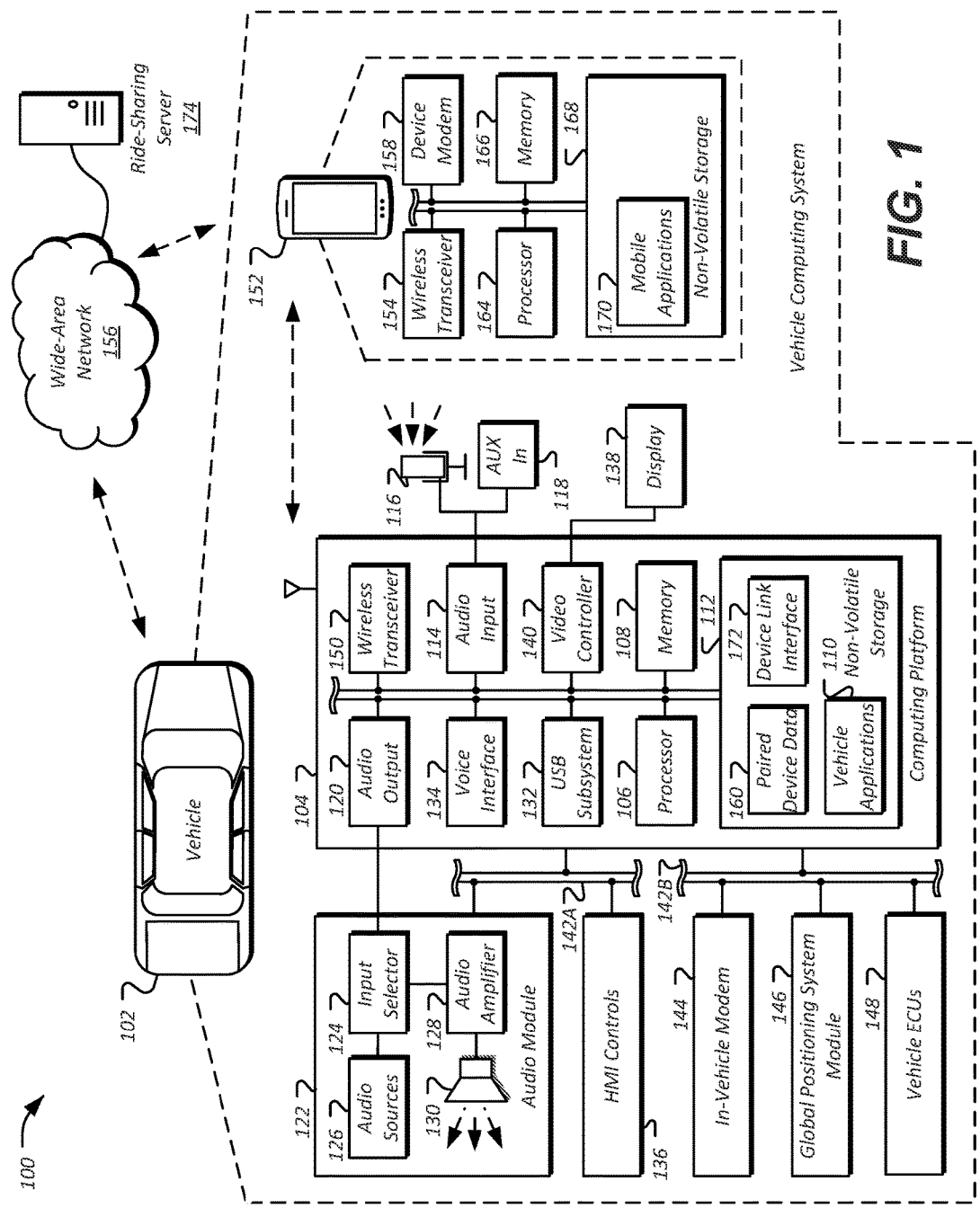
FIG. 1 illustrates an example diagram of a system that may be used to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various vehicle connectivity systems allow users to connect their smartphones or other mobile devices to their vehicles. Such systems allow the users to utilize functionality of the mobile device to control vehicle functionality. In an example, the functionality may include allowing an application of the mobile device to stream audio output through an audio system of the vehicle. In another example, the functionality may include allowing an application of the mobile device to provide user interface content on a vehicle head unit display. In yet a further example, the functionality may include allowing an application of the mobile device to control vehicle climate, entertainment, or other vehicle settings.

However, such features are generally only accessible to users whose mobile devices are paired and connected to the vehicle. Thus, passengers of the vehicle may be unable to take advantage of the vehicle connectivity systems. Passengers pair and can connect their phones to the vehicles as well, but such systems are non-trivial to set up, and the steps may be confusing for users who are unfamiliar with the make and model of vehicle.

In many ride-sharing scenarios, a passenger uses his or her mobile device to request a ride from a vehicle using a cloud service. The driver uses his or her mobile device to receive the request from the cloud server. Hence, both the passenger and the driver devices have access to a common cloud server.

This link through the cloud server may be utilized to allow the passenger to use his or her mobile device to control the vehicle functionality through the driver's mobile device. The driver may connect his mobile device to the vehicle. The passenger hails a ride and enters the vehicle. The driver may then begin the ride share. As part of the ride-hailing process or responsive to the driver indicating that the ride as begun, the mobile device of the passenger is notified of the vehicle connectivity features. The mobile device may accordingly present a user interface of controls for use of the vehicle features. To send a command to the vehicle, the passenger mobile device may send the command to the cloud server, which may forward the command to the mobile device of the driver. From the driver's mobile device, the command may be forwarded to the vehicle via the vehicle connectivity connection with the driver's mobile device. These commands may include, as some examples, to control entertainment settings of the vehicle, control climate settings of the vehicle, push a navigation address to the vehicle's head unit, or adjust seating settings of the passenger's seating location. At the end of the ride, or if the device disables the functionality, the mobile device of the passenger may automatically lose access to the vehicle functionality. Further aspects of the disclosure are discussed in further detail below.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs (Electronic Control Units) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors, and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, the vehicle modem 144, GPS module 146, and vehicle ECUs 148 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

The computing platform 104 may also include a device link interface 172 to facilitate the integration of functionality of the mobile applications 170 into the grammar of commands available via the voice interface 134. The device link interface 172 may also provide the mobile applications 170 with access to vehicle features, such as information available to the computing platform 104 via the in-vehicle networks 142 or access to the display 138. An example of a device link interface 172 may be the Ford APPLINK® component of the SYNC system provided by The Ford Motor Company of Dearborn, Mich. APPLINK® is based on the SDL technology platform, which allows APPLINK® to communicate between applications 170 executed by the mobile device 152 and the computing platform 104 of the vehicle 102.

The ride-share server 174 may be a cloud-based server or service connected to the wide-area network 156. The ride-share server 174 may be configured to facilitate communication with mobile device 152 to provide ride-sharing services. For instance, the ride-share server 174 may receive requests from users requesting to share a ride in a vehicle 102, and may match those requests to drivers of the vehicles 102. Further aspects of the operation of the ride-share server 174 are discussed in more detail below.

Figure 2:
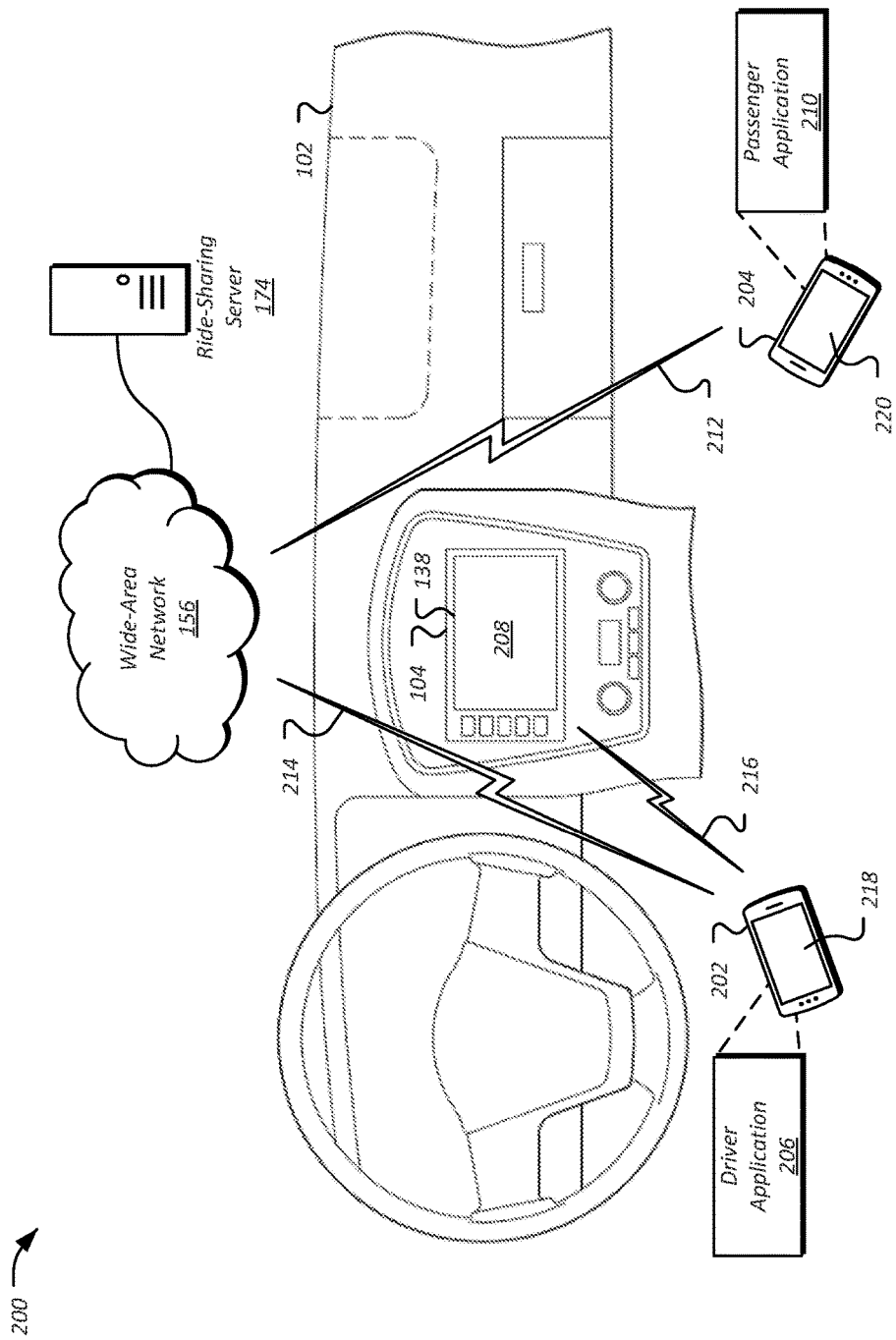
FIG. 2 illustrates an example diagram of a system including a secondary mobile device communicating with the vehicle using a connection to a primary mobile device.

FIG. 2 illustrates an example diagram of a system 200 including a secondary-connected device 204 communicating with the vehicle 102 using a primary-connected device 202. In an example, the secondary-connected device 204 may be a device of a passenger of a ride-sharing vehicle 102, while the primary-connected device 202 may be a device of a driver of the ride-sharing vehicle 102. In another example, the secondary-connected device 204 may be a device of a passenger of a ride-sharing vehicle 102, while the primary-connected device 202 may be a device attached to or otherwise maintained as within an autonomous vehicle 102. The secondary-connected device 204 may connect to the primary-connected device 202 over connections 212, 214 to the wide-area network 156 (or in other examples, over a local-area connection). The primary-connected device 202 may connect to a computing platform 104 over a preconfigured local-area connection 216 via the device link interface 172. By communicating with the primary-connected device 202, the secondary-connected device 204 may have access to vehicle 102 functions available via the primary-connected device 202, without the secondary-connected device 204 having to be specifically paired or authenticated to the vehicle 102. While an example system 200 is shown in FIG. 2, the example components as illustrated are not intended to be limiting. Indeed, the system 200 may have more or fewer components, and additional or alternative components and/or implementations may be used. As an example, the system 200 may include multiple primary-connected devices 202 within the vehicle 102.

The primary-connected device 202 may be a mobile device 152 connected to the computing platform 104 as the primary device (e.g., the "driver device"). In an example, the primary-connected device 202 may be designated as being a favorite device in the paired device data 160, such that the computing platform 104 may automatically reconnect to the primary-connected device 202 as the primary device when the primary-connected device 202 is identified by the wireless transceiver 150 as being within the vehicle 102. As another example, the primary-connected device 202 may be designated in the paired device data 160 as being a highest priority device compared to other located devices within the vehicle 102, such that the computing platform 104 may automatically reconnect to the primary-connected device 202 as the primary-connected device 202. In yet a further example, the primary-connected device 202 may be the first device identified in the paired device data 160 that is located within the vehicle 102 (or a random one of the devices).

The secondary-connected devices 204 may include other mobile devices 152 that are not connected to the computing platform 104 as the primary device. As an example, the secondary-connected devices 204 may include mobile devices 152 that have not been paired with the computing platform 104 of the vehicle 102. This may be typical for devices of ride-sharing users who have not been within the vehicle 102 before. In other examples, it is possible that the secondary-connected device 204 include devices having entries in the paired device data 160, but that are not the favorite or highest priority device.

The driver application 206 may be an example of a mobile application 170 installed to the primary-connected device 202. When executed by the primary-connected device 202, the driver application 206 utilizes the features of the computing platform 104. For instance, the driver application 206 may be configured to provide a user interface 208 to the display 138 of the computing platform 104. The user interface 208 may allow for a user to receive visual output from the driver application 206 and/or provide input to the driver application 206. In another example, the driver application 206 may include an audio streaming application, and may utilize the audio playback functionality of the audio module 122 to stream audio content from a server connected to the wide-area network 156 for playback.

The passenger application 210 may be an example of a mobile application 170 installed to the secondary-connected device 204. In an example, the passenger application 210 may be configured to communicate with the ride-share server 174 over a connection 212 of the secondary-connected device 204 to the wide-area network 156. When executed by the secondary-connected device 204, the passenger application 210 allows the passenger to send a request over the connection 212 to the ride-share server 174 for a ride-share to a destination location.

The driver application 206 may be further configured to allow the vehicle 102 to provide for ride-sharing services via the ride-share server 174. Similar to the passenger application 210, the driver application 206 may be configured to communicate with the ride-share server 174 over a connection 214 of the primary-connected device 202 to the wide-area network 156. Using the connection 214, the driver application 206 may receive requests from the ride-share server 174 indicating passengers who desire a ride, and may provide facilities for acceptance of the passengers for ride-sharing the vehicle 102. If the vehicle 102 accepts the ride, then the driver application 206 may communicate over the connection 214 to accept the ride. The passenger application 210 may accordingly receive the acceptance over the connection 212 (e.g., via the ride-share server 174).

When connected to the computing platform 104 via the connection 216, the user interface 218 of the primary-connected device 202 may be disabled. This may be done, for example, for vehicles 102 in which the primary-connected device 202 is the device of the driver, and the driver's device is secured to avoid potential issues with driver distraction. In other examples where the primary-connected device 202 is a device attached to or otherwise maintained as within an autonomous vehicle 102, the user interface 218 of the primary-connected device 202 may remain enabled so as no driver distraction issues would exist.

As the secondary-connected device 204 is not connected to the computing platform 104 via the local-area connection 216, the user interface 220 of the secondary-connected device 204 may remain enabled. Moreover, as the user interface 220 of the secondary-connected device 204 remains enabled, the user interface 220 may be available for use in configuring vehicle functionality. However, as the secondary-connected device 204 is not connected to the computing platform 104, the secondary-connected device 204 cannot command the computing platform 104 directly.

Instead, the passenger application 210 of the secondary-connected device 204 may be used to facilitate configuration of the vehicle functionality by way of the connection of the secondary-connected device 204 to the wide-area network 156. For instance, as part of the ride-hailing process or responsive to the driver indicating that the ride as begun, the ride-share server 174 may notify the secondary-connected device 204 regarding the features available on the vehicle 102 being hailed. These features may include, as some examples, control of entertainment settings of the vehicle 102, control of climate settings of the vehicle 102, to push a destination address to computing platform 104 for navigation, or adjusting seating settings of the passenger's seating location in the vehicle 102. At the end of the ride, the ride-share server 174 may signal to the secondary-connected device 204 that access to the vehicle functionality has been revoked.

Figure 3:
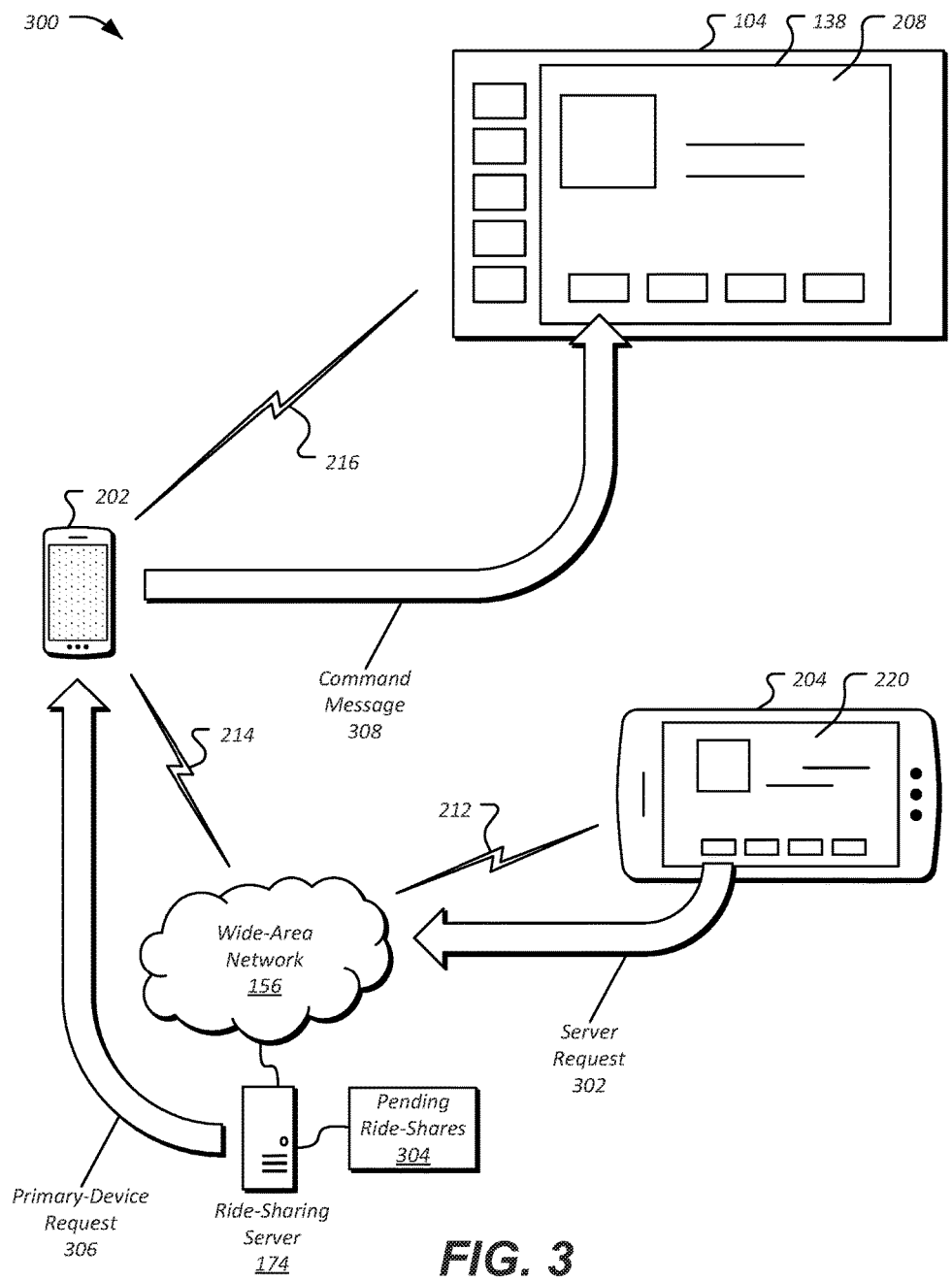
FIG. 3 illustrates an example diagram of command messaging between the primary-connected device, the secondary-connected device, and the vehicle computing platform.

FIG. 3 illustrates an example diagram 300 of command messaging between the primary-connected device 202, the secondary-connected device 204, and the vehicle computing platform 104. As shown, the passenger application 210 displays a user interface 220 including controls useful for commanding features of the computing platform 104 of the vehicle 102. The presented controls may be based on the features notified by the ride-share server 174 as being available on the vehicle 102 being hailed. Using the passenger application 210, the secondary-connected device 204 may accordingly present controls on the user interface 220 for use in the configuration of the features.

A user of the secondary-connected device 204 may accordingly use the controls on the user interface 220 to request that a command be performed by the vehicle 102. In an example, the requested command may include a change to an entertainment setting, such as a change in audio volume, a change in current radio station, or a change in input source. In another example, the requested command may include a change to a control climate setting, such as an increase or decrease in temperature setting, selection of a heated or cooled seat setting, or a change in a blower speed setting. In yet another example, the requested command may be to push a navigation address to the computing platform 104 to add or change a waypoint along the ride-share route.

In a still further example, the requested command may include an adjustment to a seat setting, such as a change in seat height, angle, or lumbar.

To send the command to the vehicle 102, the secondary-connected device 204 may send a server request 302 over the connection 212 to the ride-share server 174. The ride-share server 174 may receive the server request 302, and verify permissions of the secondary-connected device 204. In an example, the ride-share server 174 may access information indicative of pending ride-shares 304 to determine whether the server request 302 is from a secondary-connected device 204 that is on a ride-share using the vehicle 102.

The pending ride-share 304 information may include information that links the ride-share users with the corresponding vehicles 102 performing the rides. In an example, the pending ride-share 304 information may include information for ride-share passengers linked to a pending route associated with information of the vehicle 102 or the ride-share driver. The information may include, for example, account identifiers, network addresses, and/or unique device identifier information for the mobile devices 152 of the ride-share passengers, ride-share drivers, and/or ride-share vehicles 102.

If, based on the pending ride-share 304 information, the server request 302 is determined as being from a secondary-connected device 204 with a pending ride-share with the vehicle 102, the ride-share server 174 sends a primary-device request 306 to the primary-connected device 202 of the vehicle 102. In an example, the network address of the primary-connected device 202 may be retrieved by the ride-share server 174 from the pending ride-shares 304 information. Using the network address, the ride-share server 174 sends the primary-device request 306 to the primary-connected device 202. The primary-device request 306 includes an indication of the command requested from the secondary-connected device 204.

Using the information of the primary-device request 306, the primary-connected device 202 may send a command message 308 over the local-area connection 216 via the device link interface 172. Accordingly, the primary-connected device 202 may perform the command requested in the server request 302 from secondary-connected device 204, without the secondary-connected device 204 having to be paired with or connected to the computing platform 104 of the vehicle 102.

In some examples, the primary-connected device 202 may be configured to impose restrictions on the range of commands that can be applied by secondary-connected devices 204 via the primary-connected device 202. For instance, a user of the primary-connected device 202 may impose limits on deviation of a setting from a current setting value.

In some cases, the deviation may be set as user-settable bounds to the value to be controlled. In other examples, the deviation may be set as a percentage difference from a current setting value. In some cases, the deviation may be set as an additive change, while in other cases the deviation may be set as a multiplicative change. In an additive example, if the volume is at a value of 60%, the secondary-connected device 204 may be allowed by the primary-connected device 202 to adjust the volume up to 90% (60%+30%) or down to 30% (60%−30%). In a multiplicative example, the secondary-connected device 204 may be allowed by the primary-connected device 202 to adjust the volume up to 78% (60%+60%*30%) or down to 42% (60%−60%*30%).

FIG. 4 illustrates an example process 400 for providing a ride-share to the secondary-connected device 204 via the ride-share server 174. In an example, the process 400 may be performed by the ride-share server 174 in the context of the systems 100 and 200 discussed in detail above.

At operation 402, the ride-share server 174 receives a request from the secondary-connected device 204 to establish a ride-share. In an example, a user of a mobile device 152 executing the passenger application 210 may communicate with the ride-share server 174 over a connection 212 to the wide-area network 156, requesting a ride-share to a destination location.

At 404, the ride-share server 174 sends a request to available primary-connected devices 202. In an example, the ride-share server 174 may maintain a listing of mobile devices 152 executing the driver application 206 and configured to communicate with the ride-share server 174 over a connection 214 to the wide-area network 156. The ride-share server 174 may indicate to those devices over the connections 214 that there are passengers who desire a ride.

The ride-share server 174 determines whether one of the primary-connected devices 202 accepts the ride-share at 406. In an example, responsive to sending the indications to the driver applications 206, the ride-share server 174 may provide facilities for acceptance of the passengers for ride-sharing the vehicle 102. In an example, the ride-share server 174 may receive an acceptance of the ride-share message from one of the driver applications 206 indicative of a vehicle 102 accepting the ride-share. If the vehicle 102 accepts the ride request, then the driver application 206 may communicate over the connection 214 to accept the ride. If the ride-share is accepted, control passes to operation 408. Otherwise, the process 400 ends.

At operation 408, the ride-share server 174 adds the secondary-connected device 204 to the pending ride-share 304 information. The pending ride-share 304 information includes information that links the ride-share users with the corresponding vehicles 102 performing the rides. In an example, the pending ride-share 304 information may include information for ride-share passengers linked to a pending route associated with information of the vehicle 102 or the ride-share driver. The information may include, for example, account identifiers, network addresses, and/or unique device identifier information for the mobile devices 152 of the ride-share passengers, ride-share drivers, and/or ride-share vehicles 102. Moreover, the ride-share server 174 may additionally send an acceptance of the ride-share over the connection 212 to the passenger application 210.

At 410, the ride-share server 174 determines whether the ride-share is complete. In an example, at the conclusion of the ride-share, the driver applications 206 may send a message to the ride-share server 174 indicating that the ride-share for the passenger is complete. Completion may be automatically identified, in an example, based on the vehicle 102 being located within close proximity to the destination location specified by the passenger when requesting the ride-share. If the ride-share is complete, control passes to operation 412. Otherwise, control remains at operation 410.

At operation 412, the ride-share server 174 removes the secondary-connected device 204 from the pending ride-shares 304 information. Accordingly, the pending ride-shares 304 information no longer shows the passenger as being associated with the ride-share vehicle 102. After operation 412, the process 400 ends.

FIG. 5 illustrates an example process 500 for controlling vehicle functions of the vehicle 102 performing the ride-share from the secondary-connected device 204 via the ride-share server 174.

At operation 502, the ride-share server 174 sends information indicative of functionality of the vehicle 102 performing the ride-share to the secondary-connected device 204. In an example, the functionality may include allowing a mobile application 170 of the secondary-connected device 204 to stream audio output 120 through audio playback functionality of the audio module 122 of the vehicle 102. In another example, the functionality may include allowing a mobile application 170 of the secondary-connected device 204 to provide user interface content on a vehicle display 138. In yet a further example, the functionality may include allowing a mobile application 170 of the secondary-connected device 204 to control vehicle climate, entertainment, or other vehicle settings. The specific settings available in the vehicle 102 may be maintained by the ride-share server 174 in association with an account of the vehicle 102 or driver application 206, and may be sent from the ride-share server 174 to the secondary-connected device 204. Using the received information, the secondary-connected device 204 may accordingly present a user interface 220 of controls for passenger use of the vehicle features.

At 504, the ride-share server 174 receives a server request 302 from the secondary-connected device 204. The server request may indicate one or more setting changes to be applied to the vehicle 102. These changes may be requested, in an example, responsive to passenger input to the user interface 220.

At operation 506, the ride-share server 174 determines whether the secondary-connected device 204 is validated to command the vehicle 102. In an example, the ride-share server 174 accesses the pending ride-share 304 information to identify whether the server request 302 is from a secondary-connected device 204 with a pending ride-share with the vehicle 102. If so, control passes to operation 508. Otherwise, the command is refused and the process 500 ends.

At 508, the ride-share server 174 sends a primary-device request 306 to the primary-connected device 202 of the vehicle 102. In an example, the network address of the primary-connected device 202 may be retrieved by the ride-share server 174 from the pending ride-shares 304 information. Using the network address, the ride-share server 174 sends the primary-device request 306 to the primary-connected device 202. The primary-device request 306 includes an indication of the command requested from the secondary-connected device 204. Using the information of the primary-device request 306, the primary-connected device 202 may send a command message 308 over the local-area connection 216 via the device link interface 172. Accordingly, the primary-connected device 202 may perform the command requested in the server request 302 from secondary-connected device 204, without the secondary-connected device 204 having to be paired with or connected to the computing platform 104 of the vehicle 102. After operation 508, the process 500 ends.

Computing devices described herein, such as the computing platform 104, mobile devices 152, ride-share server 174, primary-connected device 202, and secondary-connected device 204 generally include computer-executable instructions where the instructions may be executable by one or more computing devices such as those listed above. Computer-executable instructions, such as those of the mobile applications 170, driver application 206, and passenger application 210, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a ride-share server, in communication with both a primary-connected device and a secondary-connected device over a wide-area network, programmed to:
responsive to acceptance of a ride-share request for the secondary-connected device, send, to the secondary-connected device, indications of which of a plurality of vehicle systems include functionality available for configuration by the secondary-connected device,
receive a request from the secondary-connected device to apply a setting change to one of the vehicle systems, and
responsive to verifying the secondary-connected device is authorized to command the vehicle, send a second request to the primary-connected device to direct the primary-connected device to command the vehicle to implement the setting change.

2. The system of claim 1, wherein the ride-share server is further programmed to:
responsive to acceptance of a ride-share request for the secondary-connected device, update ride-share information to indicate that the secondary-connected device has established a pending ride-share using the vehicle; and
verify the secondary-connected device is authorized to command the vehicle by accessing the ride-share information to confirm that the secondary-connected device has a pending ride-share using the vehicle.

3. The system of claim 1, wherein the ride-share server is further programmed to:
receive a further request from the secondary-connected device to apply a second setting change to a vehicle; and
responsive to verifying the secondary-connected device is unauthorized to command the vehicle, refrain from sending a request to the primary-connected device to direct the primary-connected device to command the vehicle to implement the second setting change.

4. The system of claim 1, wherein the setting change includes a change to a volume level or input selection of a vehicle entertainment system.

5. The system of claim 1, wherein the setting change includes a change to a seat setting of a seat of the vehicle.

6. The system of claim 1, wherein the setting change includes to push a navigation address to a computing platform of the vehicle.

7. A method comprising:
updating ride-share information indicating a secondary-connected device establishing a ride-share for a vehicle;
sending the secondary-connected device indications of a plurality of vehicle systems including settings available for configuration; and
upon verifying via the ride-share information a request from the secondary-connected device applying a change to the settings, requesting a primary-connected device within the vehicle and connected to a device link interface of the vehicle to update the settings over the interface.

8. The method of claim 7, further comprising updating ride-share information to indicate that the secondary-connected device has established a pending ride-share using the vehicle responsive to acceptance of a ride-share request for the secondary-connected device.

9. The method of claim 8, further comprising verifying the secondary-connected device is authorized to command the vehicle by accessing the ride-share information to confirm that the secondary-connected device has a pending ride-share using the vehicle.

10. The method of claim 7, further comprising:
updating ride-share information to indicate a secondary-connected device has completed the ride-share for a vehicle responsive to receiving an indication from the primary-connected device that the ride-share is complete;
receive a further request from the secondary-connected device to apply a second change to the settings; and
responsive to verifying the secondary-connected device is no longer authorized to command the vehicle, refrain from sending a request to the primary-connected device to direct the primary-connected device to command the vehicle to implement the second setting change.

11. The method of claim 7, wherein the change to the settings includes a change to a volume level or input selection of a vehicle entertainment system.

12. The method of claim 7, wherein the change to the settings includes a change to a seat setting of a seat of the vehicle.

13. The method of claim 7, wherein the change to the settings includes to push a navigation address to a computing platform of the vehicle.

14. A system comprising:
a secondary-connected device, in communication with a ride-share server over a wide-area network, programmed to send a request to the ride-share server to change a vehicle setting; and
a primary-connected device, in communication with a computing platform via a device link interface over a local-area connection and with the ride-share server over the wide-area network, programmed to request the computing platform to change the setting responsive to validation from the ride-share server,
wherein the secondary-connected device is further programmed to receive indications of which of a plurality of vehicle systems include functionality available for configuration from the ride-share server responsive to acceptance of the ride-share by the primary-connected device.

15. The system of claim 14, wherein the primary-connected device is further programmed to process changes to the settings that include: changes to a volume level or input selection of a vehicle entertainment system; changes to a seat setting of a seat of the vehicle; and addition of a navigation address to a computing platform of the vehicle.

16. The system of claim 14, wherein the change to the settings includes climate control settings including one or more of cabin temperature, fan blower speed, air conditioning, or air recirculation.

17. The system of claim 14, wherein the primary-connected device is further programmed to limit the change in the vehicle setting to within a predefined deviation of the vehicle setting from a current setting value.

18. The system of claim 17, wherein the predefined deviation is specified as a percentage difference from the current setting value.

* * * * *